US008566717B2

(12) United States Patent
Markiewicz et al.

(10) Patent No.: US 8,566,717 B2
(45) Date of Patent: Oct. 22, 2013

(54) RENDERING TEACHING ANIMATIONS ON A USER-INTERFACE DISPLAY

(75) Inventors: Jan-Kristian Markiewicz, Redmond, WA (US); Jason Silvis, Bellevue, WA (US); Adrian Garside, Sammamish, WA (US); Leroy B. Keely, Portola Valley, CA (US); Manuel Clement, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 12/145,237

(22) Filed: Jun. 24, 2008

(65) Prior Publication Data

US 2009/0319894 A1      Dec. 24, 2009

(51) Int. Cl.
*G06F 3/00*         (2006.01)
(52) U.S. Cl.
USPC ........................... 715/709; 715/707; 715/714
(58) Field of Classification Search
USPC ......... 715/863–864, 702, 706, 866, 709, 707, 715/714; 345/473, 474, 156, 173, 179; 382/189; 434/159, 162–163, 362
See application file for complete search history.

(56) References Cited

U.S. PATENT DOCUMENTS

| | | | |
|---|---|---|---|
| 5,347,295 A * | 9/1994 | Agulnick et al. | 345/156 |
| 5,347,477 A | 9/1994 | Lee | |
| 5,953,735 A | 9/1999 | Forcier | |
| 6,340,967 B1 * | 1/2002 | Maxted | 345/179 |
| 6,664,991 B1 | 12/2003 | Chew | |
| 7,039,872 B1 | 5/2006 | Raheman | |
| 7,143,213 B2 * | 11/2006 | Need et al. | 710/67 |
| 7,676,767 B2 * | 3/2010 | Hofmeister et al. | 715/863 |
| 2003/0007018 A1 | 1/2003 | Seni | |

(Continued)

FOREIGN PATENT DOCUMENTS

| EP | 1351209 | 10/2003 |
|---|---|---|
| EP | 1603031 | 12/2005 |

(Continued)

OTHER PUBLICATIONS

Kurtenbach, G. et al., "Contextual Animation of Gestural Commands," Computer Graphics Forum, vol. 13 (1994) No. 5, pp. 305-314.*

(Continued)

*Primary Examiner* — Doon Chow
*Assistant Examiner* — Wilson Varga
(74) *Attorney, Agent, or Firm* — Shook Hardy & Bacon LLP (57) ABSTRACT

Computer-readable media, computerized methods, and computer systems for intuitively surfacing a teaching animation that demonstrates a manual gesture recognized by a writing-pad tool are provided. Initially, the writing-pad tool is interrogated to determine a context of a computing environment associated with a touchscreen interface. Generally, determining includes recognizing a current condition of the writing-pad tool based on whether text is provided within a content-entry area generated thereby, ascertaining whether a focus of a cursor tool resides within the content-entry area based on whether a portion of the text is selected, and ascertaining which actions are available for invocation at the writing-pad tool based on the current condition and the focus of the cursor. The context of the computing environment is utilized to identify which teaching animations to promote to an active state. Typically the promoted teaching animations are associated with the actions ascertained as available for invocation.

18 Claims, 7 Drawing Sheets

(56) References Cited

U.S. PATENT DOCUMENTS

| | | | |
|---|---|---|---|
| 2004/0140956 A1* | 7/2004 | Kushler et al. | 345/168 |
| 2005/0120312 A1* | 6/2005 | Nguyen | 715/863 |
| 2005/0235208 A1* | 10/2005 | Arend et al. | 715/712 |
| 2006/0101354 A1* | 5/2006 | Hashimoto et al. | 715/863 |
| 2006/0136840 A1 | 6/2006 | Keely et al. | |
| 2006/0210958 A1* | 9/2006 | Rimas-Ribikauskas et al. | 434/362 |
| 2006/0242607 A1 | 10/2006 | Hudson | |
| 2007/0177803 A1 | 8/2007 | Elias | |
| 2008/0013793 A1 | 1/2008 | Hillis | |
| 2008/0129686 A1* | 6/2008 | Han | 345/156 |
| 2008/0163130 A1* | 7/2008 | Westerman | 715/863 |
| 2008/0178126 A1* | 7/2008 | Beeck et al. | 715/863 |

FOREIGN PATENT DOCUMENTS

| | | |
|---|---|---|
| WO | WO 9208183 | 5/1992 |
| WO | WO0208881 A3 | 1/2002 |
| WO | WO 2007089766 | 8/2007 |

OTHER PUBLICATIONS

PCT Search Report, International Application No. PCT/US2009/048527, mailed Jan. 29, 2010, 11 pages.

"Contextual Animation of Gestural Commands," Gordon Kurtenbach, Thomas P. Moran and William Buxton, Xerox Palo Alto Research Center, 3333 Coyote Hill Rd., Palo Alto, CA 94304, Dept. of Computer Science, Untiversity of Toronto, Toronto, Ontario, Canada, M5S 1A1, (no date listed), website: http://www.dgp.toronto.edu/~gordo/papers/GI94_Contextual_Animation.pdf.

"Gesture Based Interface for Wearable Computers," Group 02gr925 (Lau Norgaard), Supervisor: Thomas Bbaltzer Moeslund, Aalborg University, Laboratory of Computer Vision and Media Technology, Spring 2008, http://www.cvmt.dk/education/teaching/e02/midtermeval/02gr925.pdf.

"Context-Sensitive Help for Multimodal Dialogue," Helen Wright Hastie, Michael Johnston, and Patrick Ehlen, AT&T Labs—Research, 180 Park Ave., Florham Park, NJ 07932; (no date given); website: http://www.stanford.edu/~ehlen/2002-10_ICMI.pdf.

European Search Report for PCT/US2009048527 mailed Mar. 1, 2013.

* cited by examiner

RENDERING TEACHING ANIMATIONS ON A USER-INTERFACE DISPLAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, operating systems provide a variety of utilities that assist in offering user support by surfacing learning tools within a GUI being presented at a display device (e.g., computer monitor, screen on a mobile device, and the like). Frequently, access to the learning tools (e.g., online support, help directories, posted FAQs, and public libraries) is obfuscated by complicated help-menu paths. Or, the existence of these learning tools is unobvious or entirely unknown to users who may be aided by content therein.

Increasingly, gestures are being utilized for triggering actions within a computing device. These gestures may be performed by a user at a touchscreen device. In particular, performing gestures involves natural-interactive movements that are applied to the touchscreen device and communicated to hand-writing recognition software for interpretation. These natural-interactive movements, although typically simple to execute, are new to many users and not necessarily instinctive to experienced users. Accordingly, learning tools are imperative for communicating which gestures are offered, and for teaching a proper technique for performing the gestures. But, as discussed above, these learning tools are not readily available and typically difficult to discover. Accordingly, the use of gestures as an alternate form of providing user input is rejected by many users that, currently, are more efficient when using conventional means for providing user input.

As such, employing an intuitive technique for surfacing an animated gesture on a user-interface (UI) display that visibly teaches a user which gestures are presently offered and how to properly perform the offered gestures would enhance a user's experience when utilizing gestures as a primary technique for interacting with the computing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computer-readable media having computer-executable instructions embodied thereon, a computer system, and computerized methods for surfacing a teaching action on a UI display when manipulating content within a writing-pad tool. In particular, intuitive techniques are provided for initiating a teaching animation that demonstrates a manual gesture, where when the manual gesture is properly performed, an action is invoked at a writing-pad tool.

Initially, a context of a computing environment at a computing device is monitored. In embodiments, monitoring the context, or state of the computing environment, involves one or more of the following: determining a current condition of a writing-pad tool; identifying a focus of cursor tool within a content-entry area generated by the writing-pad tool; and ascertaining which actions are available for invocation based on the current condition and the focus of the cursor tool. Based on the context, and specifically the actions available for invocation, teaching animations to promote to an active state are identified. That is, the teaching animations promoted to the active state are also each mapped to actions ascertained as presently available for invocation. Representations of these teaching animations in the active state may be presented at the UI display (e.g., as a toggle-button or icon on a toolbar or separate gesture panel), thereby informing a user which gestures may be performed and/or demonstrated.

A user-initiated input may be applied to a touchscreen interface, in association with the writing-pad tool surfaced thereon, causing an operating system to launch one or more of the teaching animations in the active state. An appropriate user-initiated input for launching teaching animation(s) may include indicating the representation of a teaching animation at the touchscreen interface (e.g., contacting a location of the touchscreen interface at which the icon or toggle-button is surfaced), or executing a command that corresponds to a manual gesture mapped to the teaching animation. A signal that the teaching animation(s) are launched may be rendered at the touchscreen interface. In one instance, rendering includes playing the indicated teaching animation(s) in a separate display area that does not occlude a content-entry area generated by the writing-pad tool. Playing the teaching animation(s) typically comprises showing a video of a model hand/pen properly executing a manual gesture on exemplary or targeted text. Upon viewing the video, a user may attempt to perform the demonstrated manual gesture by emulating the teaching animation. Once the manual gesture is properly performed and received at the touchscreen interface, an action (e.g., editing action or managing action) is invoked at the writing-pad tool based on which action is mapped to the received manual gesture. In embodiments, the managing actions include at least one of the following commands: insert words, open file, or close tool. Conversely, the editing actions comprise at least one of the following commands: delete words, join words, split words, or correct words, or add space.

BRIEF DESCRIPTION OF THE DRAWINGS

The present invention is described in detail below with reference to the attached drawing figures, wherein.

DETAILED DESCRIPTION

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computer-readable media having computer-executable instructions embodied thereon, a computer system, and computerized methods for surfacing representations of a teaching animations that indicate which manual gestures are offered for execution, and for automatically launching the teaching animation(s) upon receiving an appropriate user-initiated action, thereby demonstrating a properly executed manual gesture that invokes an action at a writing-pad tool.

Accordingly, in one aspect, the embodiments of the present invention provide one or more computer-readable media having computer-executable instructions embodied thereon that, when executed, perform a method for initiating a teaching animation for demonstrating a manual gesture. Initially, the method includes monitoring a context of a computing environment of the computing device. Based on the context, the teaching animations to promote to an active state are determined. Concurrently or subsequently therewith, a user-initiated input, in association with a writing-pad tool surfaced on a touchscreen interface of a computing device, may be received. Based on the user-initiated input, one or more of the teaching animations in the active state are launched. In embodiments, an indication of launching the one or more teaching animations is rendered at the touchscreen interface.

In another aspect, a computerized method for determining which teaching animations to promote to an active state. In embodiments, the method includes interrogating a writing-pad tool to determine a context of a computing environment associated with a touchscreen interface. Generally, determining involves, but is not limited to, the following steps: recognizing that a current condition of the writing-pad tool is based on whether text is provided within a content-entry area generated by the writing-pad tool; ascertaining whether a focus of a cursor tool resides within the content-entry area based on whether a portion of the text is indicated; and ascertaining which actions are available for invocation at the writing-pad tool based on the current condition and the focus of the cursor. The context of the computing environment may be utilized to identify which teaching animations to promote to an active state. Typically, identifying includes, inter alia, selecting the teaching animations associated with the actions available for invocation. The identified teaching animations may be stored as residing in the active state. In further embodiments, the method may include receiving a user-initiated command that corresponds to a manual gesture, identifying which teaching animation is mapped to the manual gesture, and automatically launching the identified teaching gesture. In an exemplary embodiment, the launched teaching animation prompts a user to perform the manual gesture in parallel with invoking an action mapped to the user-initiated command.

In yet another aspect, embodiments of the present invention relate to a computer system embodied on one or more computer storage-media having computer-executable instructions provided thereon for launching a teaching animation. Generally, the system includes, but is not limited to, the following elements: a monitoring component, a selection component, an input component, a launching component, and a rendering component. The monitoring component monitors a context of a computing environment of a computing device. In one instance, monitoring includes retrieving a current condition of a writing-pad tool, as discussed above. The selection component determines which teaching animations to promote to an active state based on the context. The input component is configured to receive a user-initiated input in association with a writing-pad tool surfaced on a touchscreen interface of the computing device. The launching component initiates playing one or more of the teaching animations in the active state based on the user-initiated input. The rendering component displays within a display area, surfaced at the touchscreen interface, the playing teaching animations. In embodiments, the teaching animations provide a video instruction of a manual gesture used for editing content submitted to the writing-pad tool.

Generally, embodiments of the present invention relate to launching a teaching animation upon receiving a user-initiated input in association with a writing-pad tool. As used herein, the phrase "writing-pad tool" is not meant to be limiting and may encompass any application that, at sometime during operation, is capable of receiving an input via a touchscreen interface. For instance, the writing-pad tool may be a tablet personal computer (PC) input panel (TIP) that accepts manual gestures (e.g., script gestures, editing gestures, and the like) applied to a touchscreen interface and that interprets the manual gestures utilizing a form of handwriting recognition software. As such, the TIP is designed, in part, for implementing an ink-to-text procedure that provides greater flexibility and a more natural writing experience. In other instances, the writing-pad tool may include a writing pad, a character pad, an on-screen journal or whiteboard, or any other tool for revealing an input area on a touchscreen device that when contacted by a physical object (e.g., fingertip, stylus, pen), detects an input. Further, the writing-pad tool may include handwriting recognition software that allows for entering text (e.g., ASCII text) with the pen, as opposed to a conventional input device (e.g., keyboard or voice recognition), and for converting gestures applied by the pen into actions.

An aspect of the conversion to actions relates to identifying which actions are presently available or enabled for actuation. Generally, the term "actions," as used herein, refers to a result of commands processed by the writing-pad tool. For instance, the commands may be generated by a user-initiated input at the touchscreen. Based on the user-initiated input employed (e.g., a recognized gesture, a tap-selection, and the like), the operating system and/or the writing-pad tool may generate a corresponding command that invokes a particular action. By way of example, a user-initiated drag-movement with a pen at the touchscreen device may be recognized as a writing gesture, where a user is attempting to add content to a content-entry area generated by the writing-pad tool. In this case, a drafting action mapped to writing gesture is invoked that causes the user-initiated drag-movement to be converted to text, and the text to be presented at the content-entry area.

In another example, a particular user-initiated drag-movement may be recognized as a manual gesture that is mapped to an editing action or a managing action. Typically, an editing action, when invoked, performs one of a variety of manipulations to content submitted to the content-entry area. In embodiments, the editing action may include at least one of the following commands: delete words, join words, split words, or correct words, or add space. Typically, a managing action, when invoked, manages the functionality of the writing-pad tool. In embodiments, the managing action may include at least one of the following commands: insert words, open file, or close tool.

Although several different gestures for generating corresponding actions have been described above, it should be understood and appreciated by those of ordinary skill in the art that various other gestures applied to the touchscreen interface are contemplated herein, which are mapped to a plurality of differing categories of actions, and that embodiments of the present invention are not limited to those gestures and actions shown and described. For instance, a user-initiated tap-type input may be recognized as a manual gesture that is mapped to a actuation action for depressing a toggle-button.

In embodiments, a gesture may be recognized from a user-initiated drag-operation applied at a touchscreen interface. The touchscreen interface may comprise a touchscreen display, a capacitive touchscreen, or any other tactile-input device known in the relevant field. As used herein, the phrase "drag-movement" is not meant to be limiting and may encompass any constant sweep, quasi-continuous input, or recursive chain of inputs that replicate a dragging contact across a surface. In one instance, the drag-movement may include uninterrupted contact between a physical object (e.g., stylus or portion of a finger) and the touchscreen interface within a content-entry area surfaced by the writing-pad tool, or at a toolbar or gesture panel associated with the writing-pad tool. Although discussed in relation to drag-movements applied to the touchscreen interface, embodiments of the present invention contemplate any physical gesticulation being encompassed by the phrase "manual gestures." By way of example, shaking an acceleration-sensing stylus at a distance from the touchscreen interface may comprise a manual gesture.

Having briefly described an overview of embodiments of the present invention and some of the window states featured therein, an exemplary operating environment suitable for implementing the present invention is described below.

Figure 1:
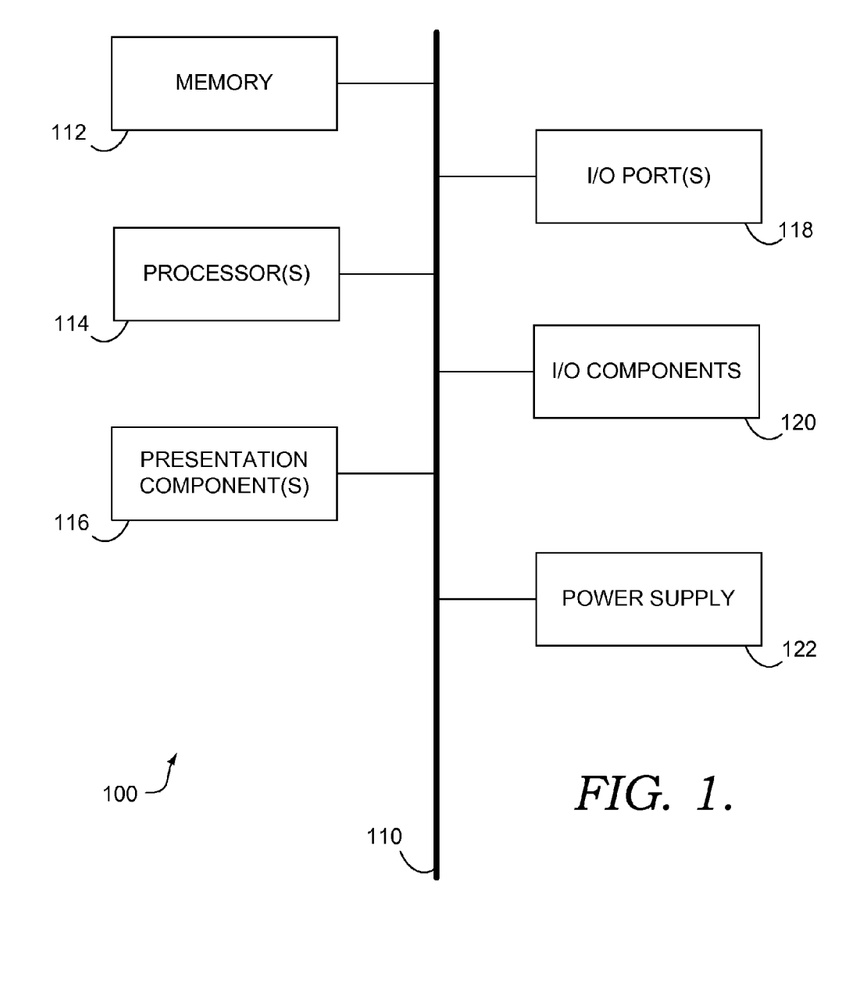
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated. In one embodiment, computing device 100 is a conventional computer (e.g., a personal computer or laptop).

In one embodiment, the invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular task, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

Accordingly, the components described above in relation to computing device 100 may also be included in a mobile device interconnected to the communications network. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
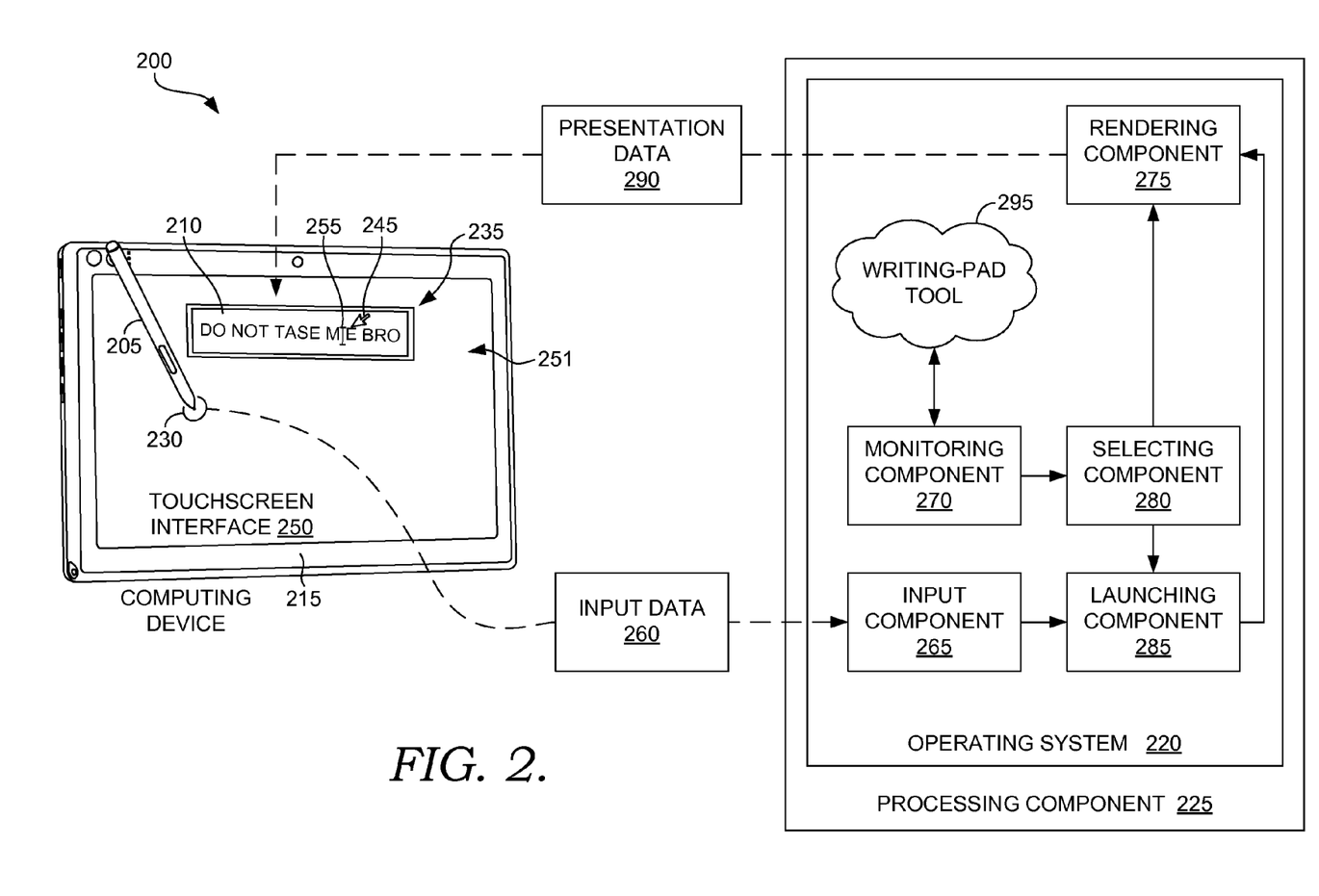
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Further, logic within an operating system 220 supporting the exemplary system architecture 200 may be embodied on an internal processing component 225 to a computing device 215, provided from a distributed computing environment, such as a remote server (not shown), or any combination thereof. In embodiments of the invention that are practiced in distributed computing environments, logic communication is linked through appropriate connections. These connections may be wired or wireless. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 215 and the remote server that houses some or all of the processing component 225, for instance, are not limited by the examples described, but embrace a wide variety of methods of communications.

Exemplary system architecture 200 includes the computing device 215 for, in part, supporting operation of the processing component 225. In an exemplary embodiment, where the computing device 215 is a tablet PC for instance, a touchscreen interface 250 may be operably connected to the computing device 215. The computing device 215 may take the form of various types of computing devices. By way of example only, the computing device 215 may be a personal computing device (e.g., computing device 100 of FIG. 1), handheld device (e.g., personal digital assistant), a mobile device (e.g., laptop computer, cell phone, media player), a consumer electronic device, various servers, and the like. Additionally, the computing device may comprise two or more electronic devices configured to share information therebetween.

In embodiments, as discussed above, the computing device 215 includes the touchscreen interface 250, and the processing component 225 (e.g., hardware) with an operating system 220 installed thereon. The computing device 215 is configured to present a UI display 251 on the touchscreen interface 250. The touchscreen interface 250, which may be operably coupled to the processing component 225, may be configured as any input/output device capable of revealing information to a user and gathering information from a user (as illustrated in FIG. 2), or may be physically separated into a presentation component and an input component. In embodiments, the presentation component may a device adapted to present content to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. In one exemplary embodiment, a UI display 251 rendered by the presentation component is configured to present a content-entry area 235 associated with a writing-pad tool 295 and/or to reveal a toolbar or gesture panel (not shown). In another exemplary embodiment, the UI display 251 is capable of rendering an indication of launching one or more teaching animations (not shown).

The input component is provided to accept user-initiated input(s) 230 affecting, among other things, invoking a particular action mapped to a gesture recognized from the user-initiated input(s) 230. In an exemplary embodiment, the input component receives the user-initiated inputs 230 directed at content 210 rendered within the content-entry area 235 surfaced on the UI display 251. Illustrative input components include a touchpad, the I/O components 120 of FIG. 1, or any other component capable of receiving the user-initiated input 230 and communicating an indication of that input to the processing component 225.

By way of example only, the input component may determine a coordinate location of where the user-initiated input 230 initiates contact therewith (e.g., location of origination of a user-initiated drag-movement), a coordinate location of where the user-initiated input 230 terminates contact therewith (e.g., location of release of a user-initiated drag-movement), and intermediate coordinate locations therebetween. These coordinate locations defining the user-initiated input 230 may be appended with a timestamp, which is utilized to by input component 265 to decipher a gesture from the user-initiated input, as discussed more fully below. Further, these coordinate locations may be compared with a positions of icons representing teaching animations to determine whether to launch one or more of the teaching animations.

Although several differing configurations of the touchscreen interface 250 have been described above, it should be understood and appreciated by those of ordinary skill in the art that various types of combined presentation components and input components that receive inputs from physical contact, or otherwise, may be employed as the touchscreen interface 250, and that embodiments of the present invention are not limited to those examples that are shown and described above. In an exemplary embodiment, the presentation component and the input component perform the functionality described above contemporaneously and are physically combined forming the touchscreen interface 250.

In another exemplary embodiment, the touchscreen interface 250 is an active digitizer that reacts to a communicative device (e.g., companion pen) when placed within a particular proximity thereof (e.g., tracking movements of, and outputs provided by, the companion pen when hovering near a surface of the touchscreen interface 250). Accordingly, for the sake of brevity and clarity, the input component and the presentation component will hereinafter be referred to jointly as the touchscreen interface 250, which is a touchscreen that offers the functionality of both a display and an input element in a single unit.

The operating system (OS) 220 refers generally to the software that manages the sharing of the resources of the processing component 225 and provides programmers with an interface used for accessing those resources. In operation, the operating system 220 interprets system data that may include the user-initiated inputs 230 delivered as input data 260 from the touchscreen interface 250. In response, the operating system 220 may execute such processes as the following, in no particular order: monitoring a context of a computing environment of a computing device 215, where monitoring involves retrieving a current condition of the writing-pad tool 295; determining which teaching animations to promote to an active state based on the context; detecting the user-initiated input 230 applied in association with the writing-pad tool 295 surfaced on the touchscreen interface 250 of the computing device 215; launching one or more of the teaching animations in the active state based on the user-initiated input 230; and playing the launched teaching animation at the touchscreen interface 250. In embodiments, playing the teaching animations (not shown) includes rendering a video instruction of a properly executed manual gesture used for editing content submitted to the writing-pad tool 295.

In an exemplary embodiment, the operating system 220 runs on the processing component 225 and supports execution of one or more of applications, including the writing-pad tool 295. In other embodiments, the operating system 220 and/or the writing-pad tool 295 may partially or fully reside on a remotely located computing device (e.g., on another operating system, on a server located via a web address, etc.). This operating-system structure of the operating system 220 is but one example of a suitable structure that may be run on the processing component 225, and is not intended to suggest any limitation as to the scope of use or functionality of the invention. Neither should the illustrated operating system 220 be interpreted as having any dependency or requirement relating to any one or combination of receiving the input data 260 or providing presentation data 290 (e.g., information related to a teaching animation) to the touchscreen interface 250 as illustrated. Further, the writing-pad tool 295 may be integrated into the operating system 220 or the processing component 225 and is exemplary in nature and in number, and should not be construed as limiting.

In an exemplary embodiment, the operating system 220 facilitates launching teaching animations upon receiving an appropriate user-initiated input 230 by facilitating operation of the input component 265, a monitoring component 270, a selecting component 280, a launching component 285, a rendering component 275, and the writing-pad tool. This exemplary operating-system structure of the operating system 275 is but one example of a suitable structure that may be run on the processing component 225 and is not intended to suggest any limitation as to the scope of use or functionality of the invention. Neither should the illustrated operating system 220 be interpreted as having any dependency or requirement relating to any one or combination of the components 265, 270, 275, 280, 285 and 295 as illustrated. In some embodiments, one or more of the components 265, 270, 275, 280, 285 and 295 may be implemented as stand-alone applications. In other embodiments, one or more of the components 265, 270, 275, 280, 285 and 295 may be integrated directly into the touchscreen interface 250 or the computing device 215. By way of example only, a portion of the input component 265 may reside on the touchscreen interface 250, thereby assisting with capturing the user-initiated inputs 230 applied thereto by a physical object 205. It will be understood by those of ordinary skill in the art that the components 265, 270, 275, 280, 285 and 295 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one touchscreen interface 250 is shown, many more may be operably coupled to the computing device 215, thereby functioning in conjunction to present the UI display 251).

Initially, the monitoring component 270 is configured to monitor a context of a computing environment of a computing device 215. Typically, monitoring includes retrieving a current condition of the writing-pad tool 295 and ascertaining a focus 255 of a cursor tool 245. In embodiments, retrieving the current condition involves interrogating the writing-pad tool 295 to recognize the current condition of the writing-pad tool 295 based on whether content 210 (e.g., text, alphanumeric characters, images, etc.) is provided within the content-entry area 235 generated by the writing-pad tool 295. In embodiments, ascertaining the focus 255 of the cursor tool 245 involves determining whether the focus 255 of a cursor tool 245 resides within the content-entry area 235 based on whether a portion of the content 210 is indicated. In instances, the focus 255 may be an insertion point, a selection of content, a hover location of the cursor tool 245 on the touchscreen interface 250, or any other method for providing an indication on the UI display 251 that is known in the relevant field. By way of example, as illustrated in FIG. 2, the focus 255 is a flashing placeholder between the "M" and "E" of the term "ME" within the content 210.

Based on the current condition and the focus of the cursor tool 245, the actions that are available for invocation at the writing-pad tool 295 are ascertained. For instance, when no content 210 is present within the content-entry area 235, managing actions may be enabled for importing content from other sources. In another instance, when the content 210 is submitted to the content-entry area 235, editing actions may be enabled for performing edits on text or characters within the content 210. These editing actions are discussed more fully above. Accordingly, the actions made available at a particular time are context-sensitive thereby minimizing any user diversions, such as irrelevant actions, from a task at hand. Further, although not explicitly discussed herein, various other factors may be monitored to identify relevant actions in a context-sensitive environment, and these factors may be combined with the monitored factors discussed above in any manner known in the relevant field.

Figure 3:
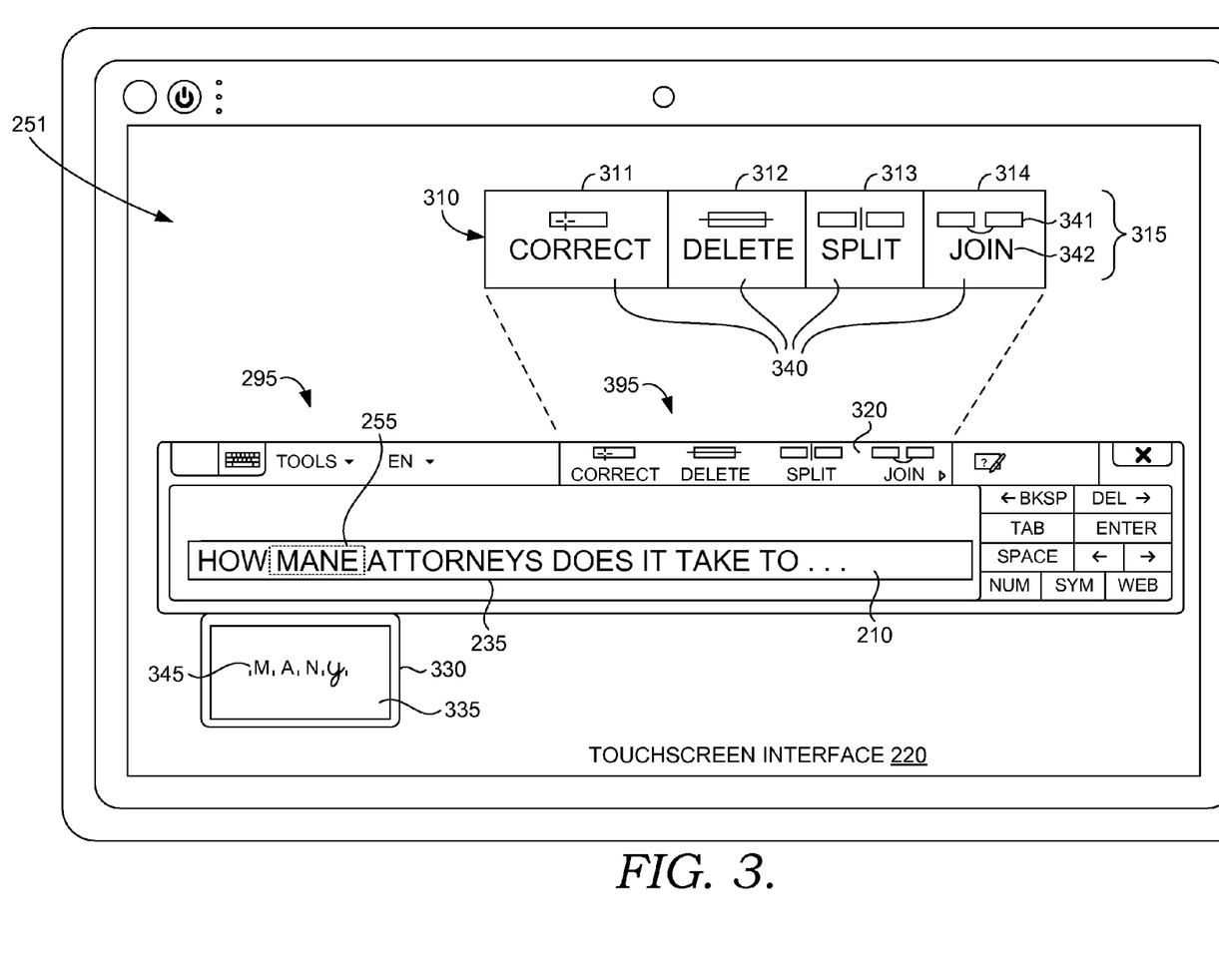
FIG. 3 is a diagrammatic view of a user-interface display illustrating a surfaced writing-pad tool associated with representations of teaching animations in the active state, in accordance with an embodiment of the present invention.

The selecting component 280 is configured to determine which teaching animations to promote to an active state based on the context and/or actions enabled for invocation, as ascertained by the monitoring component 270. In one embodiment, determining includes identifying actions ascertained as presently available for invocation and promoting those teaching animations mapped to the enabled actions to the active state. For instance, if editing actions are enabled, teaching animations that demonstrate manual gestures for correcting, deleting, splitting, joining, or other editing commands, are promoted to an active state. A depiction of surfacing a representation of the promoted teaching animations is shown in FIG. 3 at reference numeral 310. In another instance, if managing actions are enabled by the monitoring component 270, teaching animations that demonstrate manual gestures for inserting content, opening files, other file/document management commands, or any combination thereof, are promoted to the active state.

In another embodiment, the selecting component 280 is configured for identifying one or more teaching animations in accordance with the context of the computing environment. That is, based on a state of the writing-pad tool 275, or the state of any other applications running on the operating system 220, and/or the state of the input 230 (e.g., a location of the user-initiated input), a list of relevant teaching animations is created. As such, this list of teaching animations is context-sensitive and is organized to intuitively target questions that likely occur in the present state of the writing-pad tool 295 in which the user is interacting. For example, if the context of the computing environment indicates that a user is currently composing and editing a composition (i.e., by detecting content 210 in the content-entry area 235), potential questions likely relate to invoking editing actions via gestures. The teaching animations that answer these potential questions, or, in other words, explain how to properly perform manual gestures for invoking the editing actions, are promoted to an active state.

Accordingly, when particular gestures are relevant, based on a state of the writing-pad tool or computing environment, the teaching animations that explain these gestures are promoted to an active state. But, in the case where a touchscreen interface 250 is powered-down or otherwise offline such that manual gestures are no longer expected as a form of user-initiated input, no teaching animations may be promoted to an active state. If more teaching animations are promoted to an active state than allowed by a predefined threshold (e.g., number determined by a limited area of screen space allocated to surface representations of teaching animations), then a filtering process may be initiated to demote less relevant or less context-sensitive teaching animations to a deactivated state.

The rendering component 275 is configured to, in part, present a representation the teaching animations promoted to the active state. Turning temporarily to FIG. 3, embodiments of presenting a representation of active teaching animations will now be discussed. It should be noted that throughout the figures described in this specification, substantially similar features or elements are consistently depicted by common reference numerals.

Initially, FIG. 3 is a diagrammatic view of the UI display 251 illustrating the surfaced writing-pad tool 295 associated with representations of teaching animations 315 in the active state, in accordance with an embodiment of the present invention. Consistent with one embodiment of the rendering component 275 of FIG. 2, the processes of presenting a representation of the teaching animations 315 promoted to the active state includes populating selectable controls 395 for launching a teaching animation 335 a toolbar 320 that adjoins the surfaced writing-pad tool 295. In another embodiments, the processes of presenting a representation of the teaching animations 315 promoted to the active state includes populating iconic representations 311, 312, 313, and 314 of the teaching animations 315 on a translatable gesture panel 310 that is surfaced on the touchscreen interface 220 adjacent to the surfaced writing-pad tool 295. In embodiments, each of the iconic representations 311, 312, 313, and 314 include a toggle-button 340 that, when actuated, initiates a corresponding teaching animation 335 that is represented thereby. In embodiments, a descriptor inscribed within each of the toggle-buttons 340, which visibly reveals the action mapped to the representation of the teaching animation 315, is provided. In instances, the descriptor may include descriptive text 342 that describes the teaching animation 335, a representative static depiction 341 (e.g., simple pictorial graphic of gesture) of the teaching animation 315, other known indicators utilized within icons, or any combination thereof.

In the embodiment illustrated in FIG. 3, the representations of the teaching animations 315 include the iconic representations 311, 312, 313, and 314 of editing actions, such as a correction action (at the iconic representation 311), a delete action (at the iconic representation 312), a split action (at the iconic representation 313), and a join action (at the iconic representation 314). These iconic representations 311, 312, 313, and 314 of the teaching animations 315 may be displayed in the gesture panel 310 that is separately moveable from the surfaced writing-pad tool 295. That is, the gesture panel 310 floats on the touchscreen interface 220 independent of the surfaced writing-pad tool 295. In another embodiment, the representations of the editing actions 315 may be configured as selectable controls 395 that are disposed on the toolbar 320, and thus, attached to the surfaced writing-pad tool 295. Typically, the selectable controls 395 on the toolbar 320 may be expanded to express the iconic representations 311, 312, 313, and 314 of the teaching animations 315 as the toggle-buttons 340 within the gesture panel 310. Conversely, the toggle-buttons 340 within the gesture panel 310 may be collapsed to express the iconic representations 311, 312, 313, and 314 of the teaching animations 315 as the selectable controls 395 on the toolbar 320. The processes of expanding and collapsing may be executed by any know trigger (e.g., control buttons) known in the relevant field.

Further, the representations of the teaching animations 315 may be surfaced by any method utilizing the rendering component 275 of FIG. 2. Typically, the representations of teaching animations 315 reveal which teaching animations are available for instructing a user how to properly perform certain manual gestures. By providing a visual depiction of the available teaching animations 310, a user is prompted to utilize these learning aides when struggling with a submitting or editing content 210. As such, these learning aides are easily discoverable without lengthy and inefficient searching for help submenus and prevent a user from proceeding to input incorrect gestures without adequate guidance.

Returning to FIG. 2, the input component 265 is configured to receive one or more user-initiated inputs 230, in association with the writing-pad tool 250 surfaced on a touchscreen interface of the computing device 215, via the input data 260. As discussed above, the user-initiated input 230 may be drag-movement of the physical object 205 against the touchscreen interface 250, or any other manual gesture or command that may be detected by the operating system 220. In an exemplary embodiment, the input component 265 is configured to interpret the user-initiated input 230 and recognize an appropriate response. Upon, recognizing the appropriated response, the input component 265 may convey the response to the launching component 285.

The launching component 285 is configured to initiate playing one or more of the teaching animations in the active state based on the response provided by the input component 265. In particular, the launching component 285 may communicate with the selecting component 280 to understand which teaching animations are promoted to the active state, or, in other words, which teaching animations are available for rendering based on a context of the computing environment. In accordance with the received response, none, one, or a plurality of the active teaching animations are launched.

Generally, the launching component 285 processes the response from the input component 265 to determine if the user-initiated input 230 indicates that an active teaching animation is to be launched. In one instance, if the user-initiated input 230 is recognized as an actuation applied at one of the selectable controls 395 (see FIG. 3) or at one of the toggle-buttons 340 (see FIG. 3), then a teaching animation corresponding to the actuated selectable control or actuated toggle-button is launched. By way of example, with reference to FIG. 3, if a user-initiated tap-type input includes actuating, or depressing, the toggle-button 340 that has the iconic representation 311 of a correction action, then the teaching animation 335 that demonstrates a properly performed manual gesture 345 for invoking the correction action is launched.

In another instance, if a user-initiated action includes performing a secondary command that corresponds to a manual gesture, the teaching animation that demonstrates the corresponding manual gesture may be launched. For instance, with reference to FIG. 3, a portion of text may be selected within the content 210 submitted to the content-entry area 235. As previously discussed, the selected portion of text is designated as the focus 255. A secondary command to correct the selected portion of the content 210 may be triggered. A secondary command may be any user-initiated input that employs an input method beyond a manual gesture. In the instance illustrated, the term "MANE" is selected for editing and the secondary command being employed a keystroke input (not shown) from a keyboard to correct the misspelling to "MANY." In this instance, upon detecting the secondary command, the launching component 285 is configured to identify an action that corresponds to the secondary command. Because, in this case, the secondary command is employed to correct the selected portion of text at the focus 255, the correction action is identified as corresponding to the secondary action.

Next, the teaching animation 335 mapped to the correction action is launched in series, or in parallel, with performing the correction action to the selected portion of text. As such, the teaching action 335 automatically instructs a user that a manual gesture for invoking an action triggered by the secondary command is available and/or enabled. Further, the teaching action 335 automatically demonstrates to a user how to properly perform the appropriate manual gesture for invoking an action indicated by the secondary command. Thus, the user is provided with an automatically discoverable learning aide that demonstrates accelerated forms of providing input (e.g., manual gestures) in contrast to the conventional inputs (e.g., secondary commands) to which the user is accustomed. In this way, automatically launching teaching animations introduces and familiarizes users with a full range of available methods for providing inputs to a touchscreen interface and encourages the users to make use of these methods.

Although two different approaches for launching a teaching animation have been described herein, it should be understood and appreciated by those of ordinary skill in the art that other types of suitable methods that launch a teaching animation may be used, and that embodiments of the present invention are not limited to simply actuating a control/toggle button or providing a corresponding secondary command as described herein. By way of example, attempting to carry out a task by performing a manual gesture, or other form of user-initiated input, may launch a teaching animation. In another example, one or more improper drag-movements associated with a recognized manual gesture may launch a teaching animation that demonstrates how to properly perform the gesture. By launching the teaching animation via these methods above, the assistive instruction provided by the teaching animations is integrated within the normal interaction with the writing-pad tool 295 (see FIG. 2) and provides a readily discoverable learning aide.

Further, in an exemplary embodiment, a toggle control may be provided that allows a user or the operating system 220 (see FIG. 2) to manually or automatically, respectively, adjust a launch setting at the launching component 285. By adjusting the launch setting, the user or the operating system 220 may dictate whether teaching animations are automatically launched upon receiving a corresponding secondary command and/or whether teaching animations are launched upon detecting an actuation at a control/toggle button. That is, the user or the operating system 220 may enable or disable the launching of teaching animations.

Returning to FIG. 2, the rendering component 275 will now be discussed. Generally, the rendering component 275 is configured to display within a display area 330 (see FIG. 3), surfaced at the touchscreen interface 250, one or more launched teaching animations in a play mode. In embodiments, the display area 330 (see FIG. 3) is surfaced at the touchscreen interface 250 upon the rendering component 275 conveying presentation data 290 thereto.

With reference to FIG. 2, typically, in the play mode, the teaching animations provide a video instruction of a manual gesture 345 (see FIG. 3) used for editing the content 210 submitted to the surfaced writing-pad tool 295. The teaching animations in the play mode may be presented to a user in a variety of ways. In one embodiment, the teaching animation may be played in a display area that is a pop-up window. Typically, the pop-up window is separate from the surfaced writing-pad tool 295, does not occlude the content-entry area 235, and is presented in an obvious region of the touchscreen interface 250, thereby drawing a users attention to the teaching animation. In this embodiment, the manual gesture demonstrated by the teaching animation may be applied to generic content, or nondescript text that is unrelated to a selected portion of text indicated by a user within the content-entry area 235. Or, the manual gesture demonstrated by the teaching animation may be applied to a term or phrase that is substantially similar to a selected portion of text within the content-entry area 235. By way of example, with reference to FIG. 3, the selected portion of text "MANE" may be indicated by the focus 255. As such, the teaching animation 335 may be a video of a model hand and/or pen performing the manual gesture 345 for correcting a similar term "MANE" to spell "MANY."

Although discussed as a video of a model hand and/or pen performing a manual gesture, one of ordinary skill the in art will understand and appreciate that the teaching animation may be any image(s) of an artistic rendering of a manual gesture or instructions on how to perform such manual gesture. Accordingly, any know learning aide in the relevant field that promotes an understanding of how to perform a manual gesture may be considered as the teaching animation.

In another embodiment, with continued reference to FIG. 3, the teaching animation 335 may be played in the content-entry area 235. In this embodiment, the manual gesture 345 demonstrated by the teaching animation 335 may be directly applied to a selected portion of text at the focus 255 within the content-entry area 235. Accordingly, instructive feedback may be integrated within the content-entry area 235. By rendering the teaching animation 335 in this way, embodiments of the present invention implement a learning-while-drafting technique that instructs or reinforces manual gestures 345 when a user performs a particular composing/editing operation.

Although two different configurations of the rending the teaching animation 335 have been described, it should be understood and appreciated by those of ordinary skill in the art that other types of suitable locations for playing the teaching animation 335 on a UI display may be used, and that embodiments of the present invention are not limited to playing the teaching animation 335 at the display area 330 or the content-entry area 235 as described herein Upon playing the teaching animation 335 through an initial cycle of the teaching gesture 345, the teaching gesture 345 may be repeated, or looped. In one embodiment, the teaching gesture 345 may be looped a predefined number of times (e.g., once, five times, fifty times). In another embodiment, the teaching gesture 345 may be looped in a continuous play mode until interrupted by a user-initiated indication to cease looping. In one instance of this embodiment, the user-initiated indication to cease looping may be a canceling input, such as a manual gesture applied to a portion of the display area 330 in which the launched teaching animation 335 is playing. In another instance of this embodiment, the user-initiated indication to cease looping may be a drafting input, such as a manual gesture 345 applied to the content-entry area 235 generated by the writing-pad tool 295. Incident to detecting these or other predefined manual gestures, looping of the teaching animation 345 is interrupted and the display area 330 may be hidden.

Upon perceiving the teaching animation 335, a user may attempt to mimic the demonstrated manual gesture 345. If the user successfully mimics the manual gesture 345, or accurately emulates the teaching animation 335, the manual gesture provided by the user is identified as being properly performed. Accordingly, an action (e.g., editing action or managing action) mapped to the properly performed manual gesture is invoked at the writing-pad tool 295.

Turning now to FIGS. 4-7, progressive UI displays are shown that illustrate stages of revealing frames of teaching animations, upon recognizing an appropriate user-initiated input, in accordance with embodiments of the present invention. Initially, with reference to FIG. 4, an exemplary UI display 400 is depicted that includes the surfaced writing-pad tool 295 thereon. The surfaced writing-pad tool 295 includes the content-entry area 235 with content 410 submitted thereto. Because, the content 410 is present within the content-entry area 235, this context guides the surfaced writing-pad tool 295 to render representations of teaching animations 415 that are mapped to editing actions. In other embodiments, the representations of the teaching animations 415 may vary, may be mapped to other actions supported by the surfaced writing-pad tool 295, or may by communicated to a user via disparate iconic representations, typically based on the functionality of the underlying action.

As illustrated in the FIGS. 4-7, the representations of the teaching animations 415 are the selectable controls 395 populated on the toolbar 320. Although depicted in the form of the selectable controls 395, the representations of the teaching animations 415 make take on any form discussed above, such as toggle-buttons populated on a gesture panel, or may be hidden.

Figure 4:
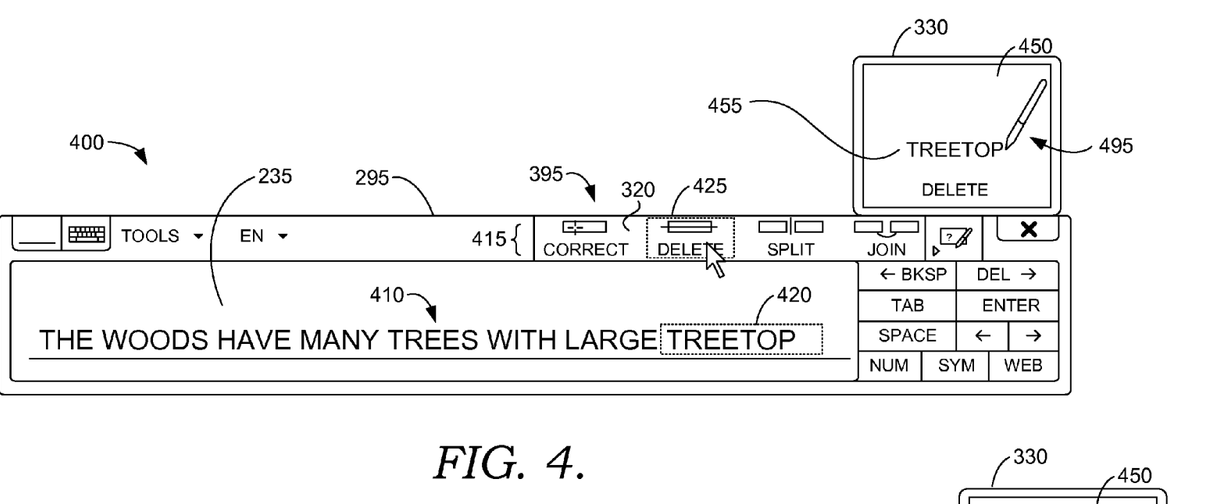
FIGS. 4-7 are progressive UI displays illustrating stages of revealing frames of teaching animations upon recognizing an appropriate user-initiated input, in accordance with embodiments of the present invention.

In instances, a portion of the content 410 is selected, or highlighted, as indicated by the focus 420. Upon actuating a selectable control 425 mapped to the delete action, the display area 330 is surfaced that renders a teaching animation 450 that performs a manual gesture 495 on the selected portion of text 455. Accordingly, the teaching animation 450 is a relevant learning aide that dynamically targets instruction to a subject term, phrase, image, etc. Further, actuation of the selectable control 425 may be performed by depressing the selectable control 425 with a cursor tool, or by any other known method of applying an actuation to a visually depicted button/toggle/control.

Figure 5:
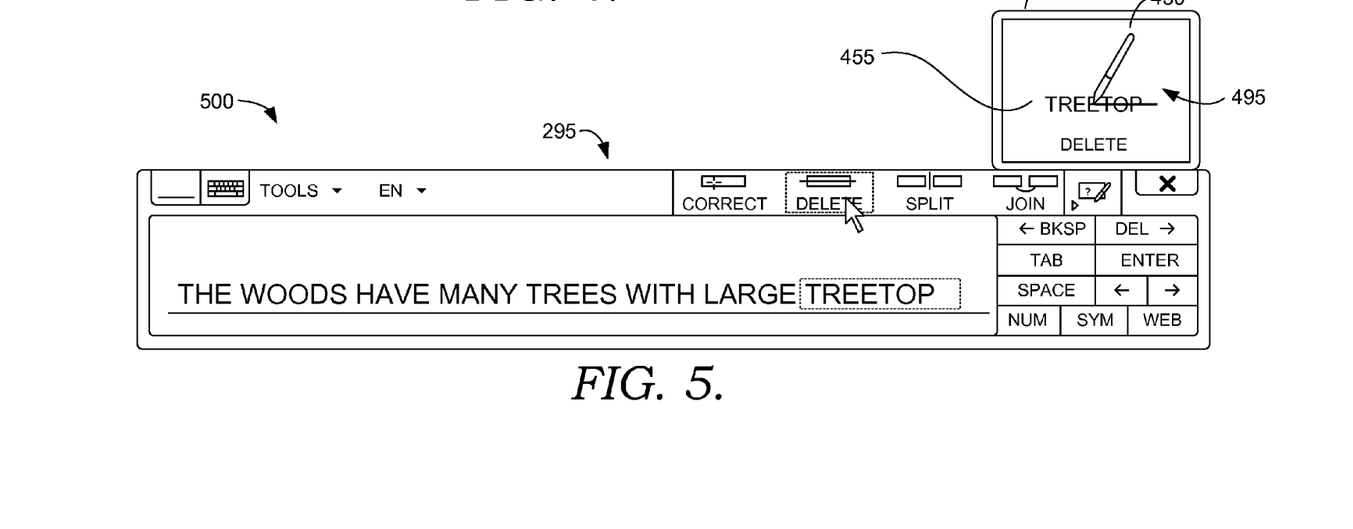
Figure 6:
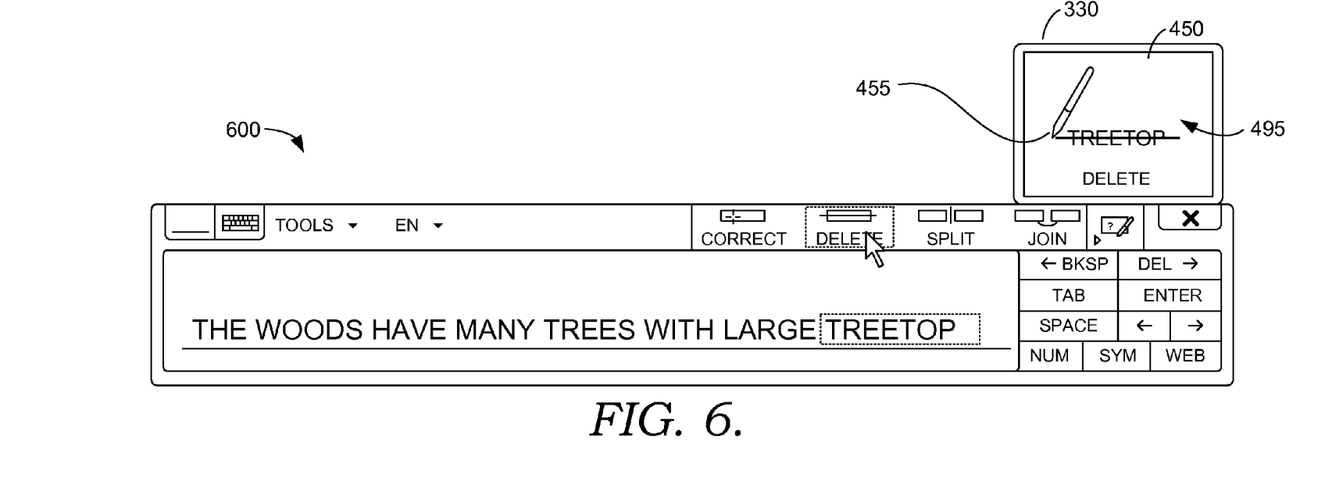

FIGS. 5 and 6 depict UI displays 500 and 600 respectively, and show advanced frames of the teaching animation 450. That is, an exemplary progression of images demonstrating the manual gesture 495, as applied to the selected portion of text 455, is illustrated. Upon completion of a cycle of the progression, the progression may be looped or the display area 330 may be hidden.

Figure 7:
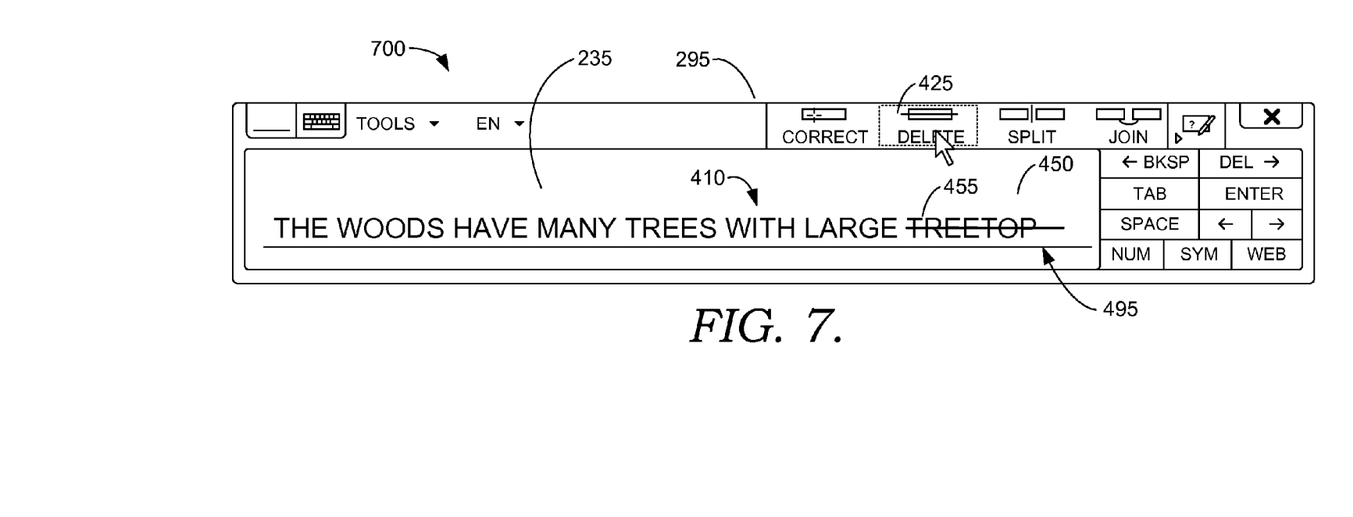

Turning to FIG. 7, a UI display 700 is depicted that shows the surfaced writing-pad tool 295 with the content 410 provided in the content-entry area 235. In this embodiment, the teaching animation 450 is configured to demonstrate the manual gesture 495 on the selected portion of the text 455 within the content-entry area 235. As discussed above, the teaching animation 450 may be launched upon a user actuating the selectable control 425. In other embodiments, the teaching animation may launched upon receiving a secondary command that invokes an action mapped to the teaching animation 450.

Figure 8:
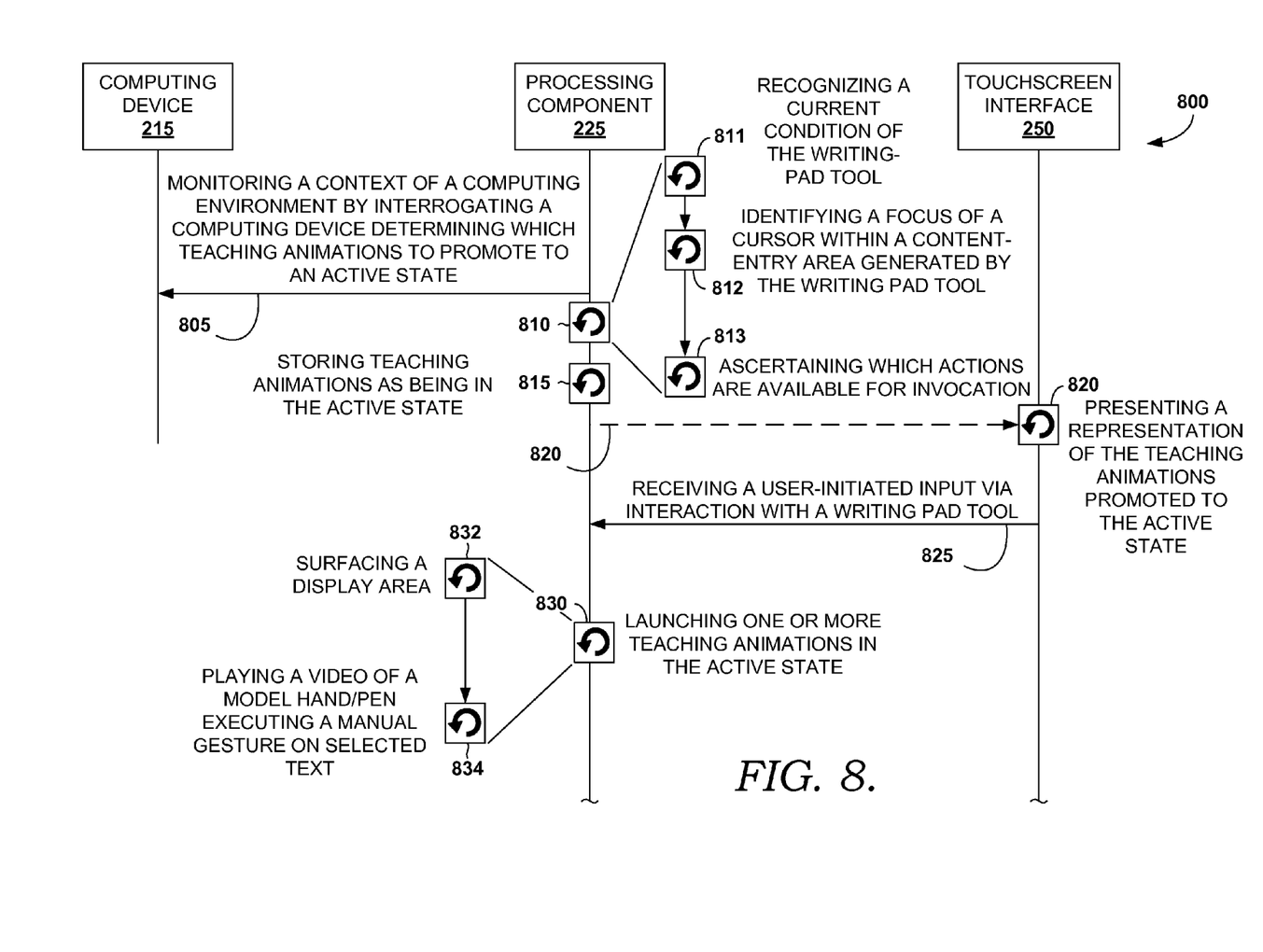
FIGS. 8 and 9 are operational flow diagram illustrating a process for initiating a teaching animation that demonstrates a manual gesture, the process implemented on suitable exemplary system architecture in accordance with an embodiment of the present invention.
Figure 9:
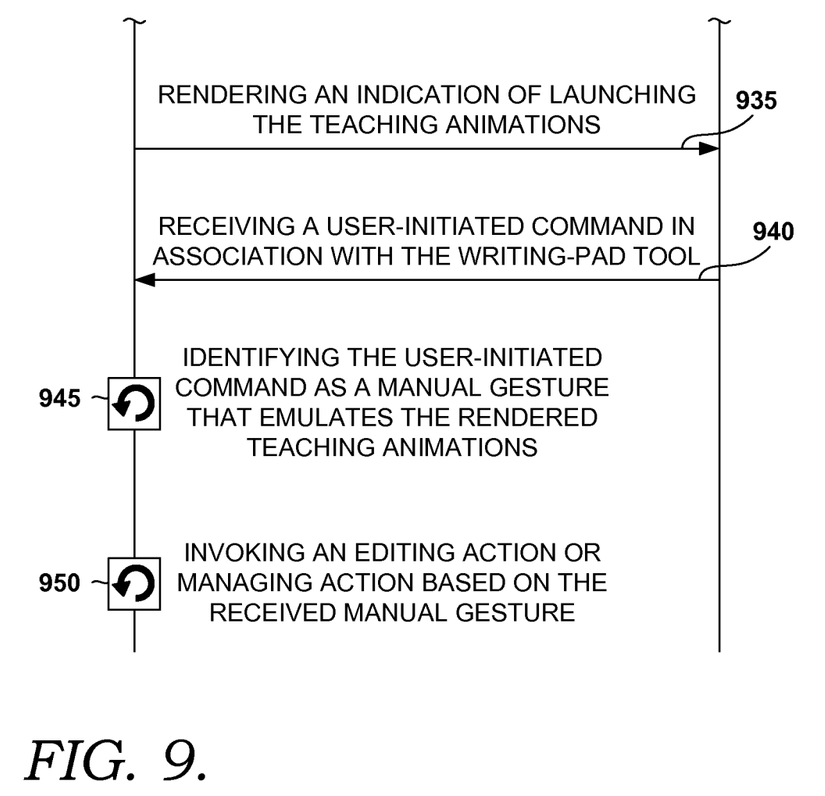

Turning now to FIGS. 8 and 9, an operational flow diagram is illustrated that shows a process 800 for initiating a teaching animation that demonstrates a manual gesture, where the process is implemented on suitable exemplary system architecture in accordance with an embodiment of the present invention. With reference to FIG. 8, initially, an operating system installed on the processing component 225 dynamically monitors the context of the computing environment of the computing device 215, as indicated by procedure 810. In one embodiment, monitoring includes interrogating 805 the computing device 215 to determine which teaching animations to promote to an active state. In other embodiments, monitoring the computing environment includes the following steps, in no particular order: recognizing a current condition of the writing-pad tool (see procedure 811), identifying a focus of a cursor within a content-entry area generated by the writing-pad tool (see procedure 812), and ascertaining which actions are available for invocation based on the context and the focus (see procedure 813).

Upon ascertaining which actions are available for invocation, teaching animations that are mapped to these actions are identified and promoted to an active state. As indicated by procedure 815, the promoted teaching animations may be temporarily stored in the active state. In addition, a user may be provided with an indication of which teaching animation are in the active state, or available for launching, upon presenting a representation of these teaching animations at a UI display, as indicated at procedure 820. Typically, the UI display is rendered on the touchscreen interface 250.

As indicated at reference numeral 825, a user-initiated input, directed at a presented representation of the teaching animation, may be received via the user's interaction with a writing-pad tool surfaced on the touchscreen device 250. Upon receipt of the input, procedure 830 may be executed for launching one or more teaching animations promoted to the active state. In one instance, launching may involve surfacing a display area (see procedure 832) and playing a video of a model hand/pen executing a manual gesture on selected text (see procedure 835). Further, launching the teaching animations, in embodiments, may, or may not cause the actions mapped thereto to be invoked.

With reference to FIG. 9, an indication of launching the teaching animations is rendered on the touchscreen interface 250, as indicated by reference numeral 935. In embodiments, as indicate by reference numeral 940, a user-initiated command may be received in association with the writing-pad tool. As indicated by procedure 945, the user-initiated command may be identified as a manual gesture that emulates the rendered teaching animation. When identified as such, an action (e.g., editing action, managing action, etc.) is invoked based on the received manual gesture.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer-readable memory device containing stored computer-executable instructions that, when executed, perform a method for initiating a teaching animation for demonstrating a manual gesture, the method comprising:
    determining a current condition of a writing-pad tool running on the computing device, wherein determining includes recognizing whether content is provided within a content-entry area generated by the writing-pad tool;
    using the current condition of the writing pad tool to determine which actions are available for invocation and which actions are unavailable, wherein using the current condition comprises:
        (a) when content is provided within the content-entry area of the writing-pad tool, designating one or more editing actions as being active, while one or more managing actions are designated as being inactive; and
        (b) when content is absent from the content-entry area of the writing-pad tool, designating the one or more managing actions as being active, while the one or more editing actions are designated as being inactive, wherein the one or more editing actions differ in functionality from the one or more managing actions;
    enabling a first group of teaching animations to that are associated with the actions that are designated as being active;
        disabling a second group of the teaching animations that are associated with the actions designated as being inactive;
        receiving a user-initiated input in association with a writing-pad tool surfaced on a touchscreen interface of a computing device;
        based on the user-initiated input, launching one or more of the teaching animations that are enabled; and
        rendering at the touchscreen interface an indication of launching the one or more teaching animations.

2. The computer-readable memory device of claim 1, the method further comprising:
    receiving at the touchscreen interface the manual gesture that emulates the rendered one or more teaching animations; and
    invoking an editing action of the one or more editing actions or a managing action of the one or more managing actions at the writing-pad tool based on which action is mapped to the received manual gesture.

3. The computer-readable memory device of claim 1, further comprising presenting a representation of the teaching animations that are enabled, wherein the teaching animations in the active state are each mapped to actions determined to be available for invocation based on, in part, the current condition of the writing pad tool in conjunction with a focus of a cursor.

4. The computer-readable memory device of claim 3, wherein presenting a representation of the teaching animations that are enabled comprises arranging selectable controls for launching the teaching animations on a toolbar that is adjoining the surfaced writing-pad tool.

5. The computer-readable memory device of claim 3, wherein presenting a representation of the teaching animations that are enabled comprises organizing iconic representations of the teaching animations on a translatable gesture panel that is surfaced on the touchscreen interface adjacent to the surfaced writing-pad tool.

6. The computer-readable memory device of claim 5, wherein each of the iconic representations comprise a toggle-button that, when actuated, initiates the teaching animation that is represented thereby, and a descriptor inscribed within the toggle-button that visibly reveals the action mapped to the teaching animation.

7. The computer-readable memory device of claim 6, receiving a user-initiated input in association with a writing-pad tool comprises detecting contact between a physical object and a writing surface of the touchscreen interface; wherein the contact occurs at the toggle-button.

8. The computer-readable memory device of claim 1, wherein the one more teaching animations comprises a video of a model hand properly executing the manual gesture on nondescript text.

9. The computer-readable memory device of claim 8, the method further comprising:
    looping the play of the teaching animation for a predefined number of cycles;
    detecting the manual gesture applied to a portion of the display area in which the one or more launched teaching animations are playing; and
    incident to detecting the manual gesture, interrupting the looping of the teaching animation and hiding the display area.

10. The computer-readable memory device of claim 8, the method further comprising:
    looping the play of the teaching animation for a predefined number of cycles;
    detecting the manual gesture applied to the content-entry area generated by the writing-pad tool; and
    incident to detecting the manual gesture, interrupting the looping of the teaching animation and hiding the display area.

11. The computer-readable memory device of claim 10, the method further comprising:
    incident to detecting the manual gesture, determining whether the manual gesture is properly performed;
    when the manual gesture is properly performed, invoking at least one of the one or more editing actions at the writing-pad tool, wherein the at least one editing action is mapped to the manual gesture; and
    altering content submitted to the content-entry area.

12. The computer-readable memory device of claim 1, wherein the one or more managing actions comprise at least one of the following commands: insert words, open file, or close tool, and wherein the one or more editing actions comprise at least one of the following commands: delete words, join words, split words, or correct words, or add space.

13. A computerized method for determining which teaching animations to enable, the method comprising:

interrogating a writing-pad tool to determine a context of a computing environment associated with a touchscreen interface, wherein determining comprises:
   (a) recognizing a current condition of the writing-pad tool based on, in part, a determination of whether content is provided within a content-entry area generated by the writing-pad tool;
   (b) when content is provided within the content-entry area, enabling a first group of the teaching animations associated with editing actions and disabling a second group of the teaching animations associated with managing actions; and
   (c) when content is absent from the content-entry area, enabling the second group of the teaching animations associated with the managing actions and disabling the first group of the teaching animations associated with the editing actions;
identifying the first group or the second group of the teaching animations as being enabled; and
at least temporarily storing the identified teaching animations as being available for invocation and storing a remainder of the teaching animations as being unavailable for invocation.

14. The computerized method of claim 13, further comprising:
receiving a user-initiated command that corresponds to a manual gesture;
identifying which teaching animation is mapped to the manual gesture; and
automatically launching at least one of the identified teaching animations prompting a user to perform the manual gesture in parallel with invoking an action mapped to the user-initiated command.

15. The computerized method of claim 14, further comprising providing a toggle control that allows a user to disable or enable automatically launching the identified teaching animations upon receiving the user-initiated command that is associated therewith.

16. The computerized method of claim 13, further comprising:
surfacing a representation of one or more of the teaching animations stored in the active state;
receiving a user-initiated input indicating the representation of a teaching animation stored in the active state; and
automatically launching the indicated teaching animation.

17. The computerized method of claim 16, wherein launching the teaching animation comprises:
recognizing a portion of the content within a content-entry area of the writing-pad tool is indicated by a cursor tool; and
launching the teaching animation associated with an editing action of the one or more editing actions within the content-entry area, wherein launching comprises:
   (a) applying a manual gesture, replicated by the teaching animation, to the indicated portion of content; and
   (b) looping the application of the replicated manual gesture to the indicated portion of content until a user-initiated indication to cease is received.

18. A computer system containing a computer memory device containing computer-executable instructions for launching a teaching animation, the system comprising:
a monitoring component to determine a current condition of a writing-pad tool, and wherein determining includes recognizing whether content is provided within a content-entry area generated by the writing-pad tool;
a selection component that uses the current condition of the writing pad tool to determine which teaching animations to enable and which teaching animations to disable, wherein determining comprises: when content is provided within the content-entry area of the writing-pad tool, designating one or more editing actions as being active and designating one or more managing actions as being inactive; when content is absent from the content-entry area of the writing-pad tool, designating the one or more managing actions as being active and designating the one or more editing actions as being inactive; identifying a first group of the teaching animations as being available for invocation upon the one or more editing action being designated as active; and identifying a second group of the teaching animations as being available for invocation upon the one or more managing actions being designated as active;
an input component to receive a user-initiated input in association with a writing-pad tool surfaced on a touchscreen interface of the computing device;
a launching component to initiate playing the one or more teaching animations identified as being available for invocation based on, in part, the user-initiated input; and
a rendering component to display within a display area, surfaced at the touchscreen interface, the one or more playing teaching animations.

* * * * *